Sept. 12, 1950   R. H. WHISLER, JR   2,522,323
SHOCK ABSORBER SEAL STRUCTURE
Filed Aug. 28, 1944

INVENTOR.
RALPH H. WHISLER Jr.
BY
ATTORNEYS

Patented Sept. 12, 1950

2,522,323

UNITED STATES PATENT OFFICE 2,522,323

SHOCK ABSORBER SEAL STRUCTURE

Ralph H. Whisler, Jr., Monroe, Mich., assignor to Monroe Auto Equipment Company, Monroe, Mich., a corporation of Michigan Application August 28, 1944, Serial No. 551,530

2 Claims. (Cl. 309—23)

This invention relates generally to shock absorbers and refers more particularly to hydraulic shock absorbers of the direct acting type.

One of the essential objects of the invention is to provide a shock absorber having an improved seal assembly between the outer casing and dust sleeve thereof to prevent dirt, dust, mud and the like from entering the interior of the shock absorber.

Another object is to provide a seal assembly wherein a fabric wad is employed as the primary sealing element and is held against displacement by means of two retaining rings that are rigidly secured, preferably by welding operations, to the outer casing of the shock absorber.

Another object is to provide a seal assembly wherein a resilient gasket is employed as a secondary sealing element and is held against displacement by means of one of the retaining rings aforesaid and a third retaining ring that is also welded to the outer casing of the shock absorber and that is adapted to engage a stop or abutment carried by the dust sleeve on the rebound stroke of the shock absorber structure to limit the extension thereof.

Another object is to provide a compact assembly that is simple in construction, economical to manufacture and efficient in operation.

Other objects, advantages and novel details of construction of this invention will be made more apparent as this description proceeds, especially when considered in connection with the accompanying drawing, wherein.

Figure 1:
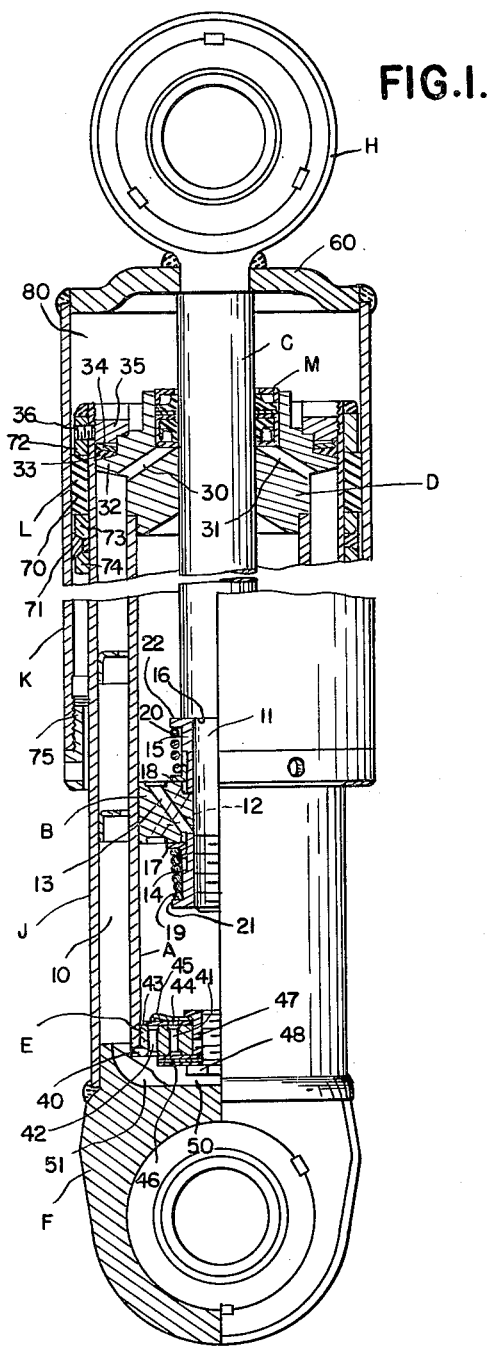
Fig. 1 is a fragmentary elevational view of a shock absorber structure embodying my invention with parts broken away and in section.
Figure 2:
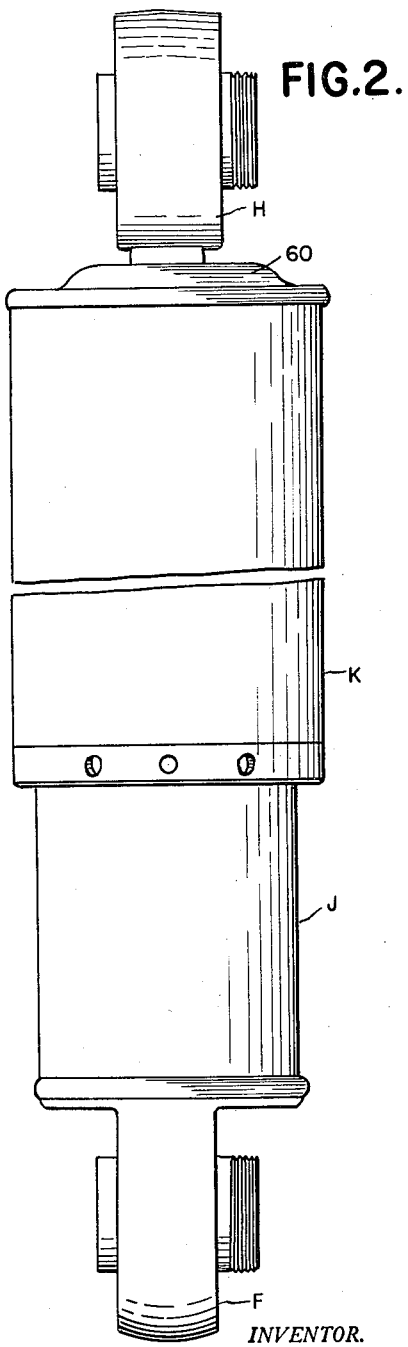
Fig. 2 is a fragmentary elevational view of the shock absorber illustrated in Fig. 1 taken substantially at right angles to the view thereof in Fig. 1.

Referring now to the drawing, A is a pressure cylinder, B is a reciprocating piston in said cylinder, C is an actuating rod for the piston, D is a combination closure for one end of the cylinder and a guide for said rod, E is a valve assembly at the other end of the cylinder, F and H respectively are apertured attaching heads for the rod C and cylinder A adapted to be connected to relatively movable parts (not shown) of a vehicle, J is a tubular casing substantially concentric with the pressure cylinder A and cooperating therewith and with the head F and closure D to form a reserve chamber 10, K is a dirt sleeve carried by the rod C and substantially concentric with the casing J, and L is a seal assembly between the casing J and dirt sleeve K to prevent dirt, dust, mud and the like from entering the interior of the shock absorber.

As shown, the piston B is mounted on a reduced inner end portion 11 of the rod C and slidably engages the inner walls of the pressure cylinder A. The piston has two sets of open ended passages 12 and 13 respectively, each set preferably inclining from a large diameter circle on one side to a smaller diameter circle on the other side of the piston. Flanged sleeves 14 and 15 respectively are upon the reduced end portion 11 of the rod C, the sleeve 15 being free upon the rod and abutting a shoulder 16 thereof, and the sleeve 14 threadedly engaging the rod and serving as a retaining nut for the parts. Valves 17 and 18 respectively are slidable on the sleeves 14 and 15 below and above the piston and control the flow of hydraulic medium through the passages 12 and 13 respectively. Coil springs 19 and 20 respectively encircle the sleeves 14 and 15 between the flanges 21 and 22 thereof and the valves 17 and 18 to normally hold the valves in closed position.

The closure member D is within and constitutes an endwise extension of the cylinder A. Preferably this closure member D contains a seal assembly M engaging the piston rod C and has two inclined passages 30 and 31 respectively for conducting to the reserve chamber 10 any hydraulic medium that may be scraped or wiped from the rod C by the seal assembly M. A lateral flange 32 of the closure member D engages the casing J, and a synthetic rubber gasket 33 is held against the flange 32 and casing J by a spring retaining ring 34 and lock ring 35 to provide a tight seal between the casing J and closure D. Preferably the retaining ring 34 is dished so that the band portion thereof is inclined against the gasket 33. The lock ring 35 threadedly engages the casing J to serve as an adjusting nut for the retaining ring 34. Consequently when the lock ring 35 is tightened, the retaining ring 34 and gasket 33 will be compressed. As the retaining ring 34 is compressed it will tend to flatten out under the pressure of the lock ring 35, and in doing so will compress to a greater extent the gasket 33 toward the casing J so that a tighter seal between the parts may be obtained. Should the gasket 33 tend to set or later on lose some of its resiliency, then the compressed retaining ring 34 will tend to return to its normal dished condition, and in doing so will exert pressure against the gasket sufficiently to automatically maintain a tight seal. Any suitable means such as a set screw 36 threadedly engaging the casing J and bearing against the lock nut 35 may be employed to hold the lock nut in adjusted position.

The valve assembly E is conventional in construction and includes a body 40 within and forming an endwise extension of the cylinder A, inner and outer passages 41 and 42 respectively in the body for hydraulic medium, a disc valve 43 controlling the flow of hydraulic medium through the outer passages 42 and having openings 44 registering with the inner passages 41, a substantially star-shaped spring 45 engaging the valve 43 and normally holding the same in closed position, a laminated disc valve 46 controlling the flow of hydraulic medium through the inner passages 41, and retaining nuts 47 and 48 respectively for the valves 43 and 46 and spring 45.

The attaching head F is rigid with the casing J and has a recess 50 opposite the valve assembly E. Preferably ribs 51 of the head engage and form seats for the body 40 of the valve assembly and provide passages for hydraulic medium between the recess 50 and reserve chamber 10. The head H is rigid with the piston rod C. The dirt sleeve K is rigid with a plate 60 on the piston rod C adjacent the head H and cooperates with such plate to form an enclosure for the closure member D and associated parts.

The seal assembly L between the dirt sleeve K and casing J comprises primary and secondary sealing elements 70 and 71 respectively and three retaining rings 72, 73 and 74 respectively. The primary sealing element 70 consists of a fabric wad and is held against displacement by the rings 72 and 73 which are preferably welded or otherwise rigidly secured to the casing J. The secondary sealing element 71 is a resilient gasket and is held against displacement by means of the retaining rings 73 and 74 respectively. The ring 74 is also welded to the casing J and is adapted to engage an adjustable stop or abutment 75 carried by the dust sleeve K on the rebound stroke of the piston B to limit the extension of the shock absorber structure. Preferably the stop 75 threadedly engages the dust sleeve K so that it may be adjusted to various positions as desired.

Both the sealing elements 70 and 71 are compressed by and have a wiping engagement with the dust sleeve K during relative movement of the sleeve K and casing J, hence dust, dirt, mud and the like will be effectively prevented from entering the space 80 within the shock absorber.

In use, the piston B will be on its compression stroke in the cylinder when the attaching heads F and H at opposite ends of the shock absorber are moved toward each other by relatively movable parts of a vehicle (not shown) to which they are connected. On the compression stroke, the hydraulic medium in the cylinder A will flow through the inclined passages 12 in the piston to open the valve 18, and will flow through the inner passages 41 in the valve assembly E past the valve 46 to the reserve chamber 10. When the attaching heads F and H are moved away from each other by the relatively movable parts of the vehicle (not shown) the piston B will be on its rebound stroke and will cause hydraulic medium in the reserve chamber 10 to flow through the outer passages 42 in the valve assembly E past the valve 43 to the cylinder A, and will cause hydraulic medium in the cylinder to flow through the inclined passages 13 in the piston to open the valve 17. Thus, the proper resistance in both directions will be properly afforded.

What I claim as my invention is:

1. In a hydraulic shock absorber having a tubular casing and a dust sleeve substantially concentric with said casing, a seal assembly between said casing and dust sleeve comprising primary and secondary sealing elements freely encircling and spaced longitudinally of said casing, said sealing elements being compressed by and having wiping engagement with said sleeve, the primary sealing element comprising a fabric wadding, the secondary sealing element being a resilient gasket, and means rigid with said casing for retaining said sealing elements against displacement, including rings encircling and welded to said casing at opposite side edges of said sealing elements, one of said rings serving as a spacer for said primary and secondary sealing elements.

2. In a hydraulic shock absorber having a tubular casing and a dust sleeve substantially concentric with said casing, a seal assembly between said casing and dust sleeve comprising a sealing element freely encircling said casing and having wiping engagement with said sleeve, rings welded to said casing at opposite side edges of said sealing element for holding said element against displacement, a second sealing element freely encircling said casing beside one of said rings and having wiping engagement with said sleeve, and another ring rigid with said casing at one side edge of said second sealing element and cooperating with said one ring for holding said second sealing element against displacement.

RALPH H. WHISLER, Jr.

REFERENCES CITED

The following references are of record in the file of this patent:

UNITED STATES PATENTS

| Number | Name | Date |
|---|---|---|
| 934,125 | Young | Sept. 14, 1909 |
| 1,179,253 | Westinghouse | Apr. 11, 1916 |
| 1,539,229 | Akeyson | May 26, 1925 |
| 1,942,973 | Peters | Jan. 9, 1934 |
| 2,078,364 | Becker et al. | Apr. 27, 1937 |
| 2,108,881 | Casper | Feb. 22, 1938 |
| 2,110,098 | Strecker | Mar. 1, 1938 |
| 2,138,513 | Rossman et al. | Nov. 29, 1938 |
| 2,244,501 | Pierce | June 3, 1941 |
| 2,249,400 | Shimer | July 15, 1941 |
| 2,293,167 | Overbeke | Aug. 18, 1942 |
| 2,295,521 | Payne | Sept. 8, 1942 |
| 2,343,134 | Cawood | Feb. 29, 1944 |
| 2,355,491 | Whisler, Jr. | Aug. 8, 1944 |

FOREIGN PATENTS

| Number | Country | Date |
|---|---|---|
| 315,917 | Great Britain | July 22, 1929 |
| 319,816 | Great Britain | Sept. 30, 1929 |
| 741,291 | France | Dec. 3, 1932 |
| 329,199 | Italy | Sept. 3, 1935 |